(No Model.) 2 Sheets—Sheet 1.

L. W. O'BRIAN.
WHEEL HORSE RAKE.

No. 430,483. Patented June 17, 1890.

Witnesses
Edwin L. Bradford
Frank Dorian

Inventor
Leonard W. O'Brian
By his Attorney in fact
Chas. E. Barber (No Model.) 2 Sheets—Sheet 2.

L. W. O'BRIAN.
WHEEL HORSE RAKE.

No. 430,483. Patented June 17, 1890.

Witnesses
Edwin L. Bradford
Frank Dorian.

Inventor
Leonard W. O'Brian
By his Attorney in fact
Chas. E. Barber

UNITED STATES PATENT OFFICE.

LEONARD W. O'BRIAN, OF BELLEVUE, OHIO, ASSIGNOR TO THE FREMONT CULTIVATOR COMPANY, OF SAME PLACE.

WHEEL HORSE-RAKE.

SPECIFICATION forming part of Letters Patent No. 430,483, dated June 17, 1890.

Application filed June 15, 1888. Serial No. 277,224. (No model.)

*To all whom it may concern:*

Be it known that I, LEONARD W. O'BRIAN, a citizen of the United States, residing at Bellevue, Huron county, State of Ohio, have invented a certain new and useful Improvement in Wheel Horse-Rakes, of which the following is so full, clear, and exact a description as will enable others skilled in the art to which my invention appertains to make and use the same, reference being had to the accompanying drawings, in which—

Figure 1:
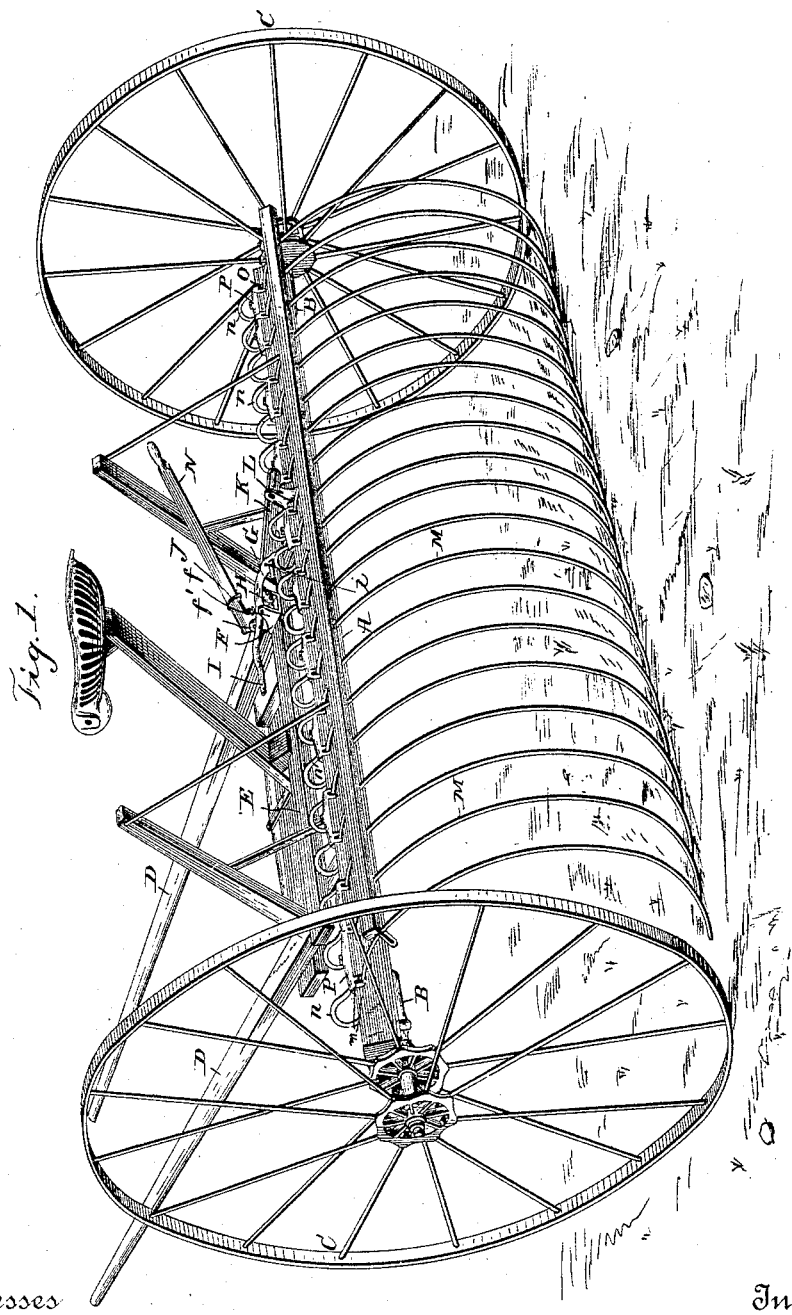
Figure 2:
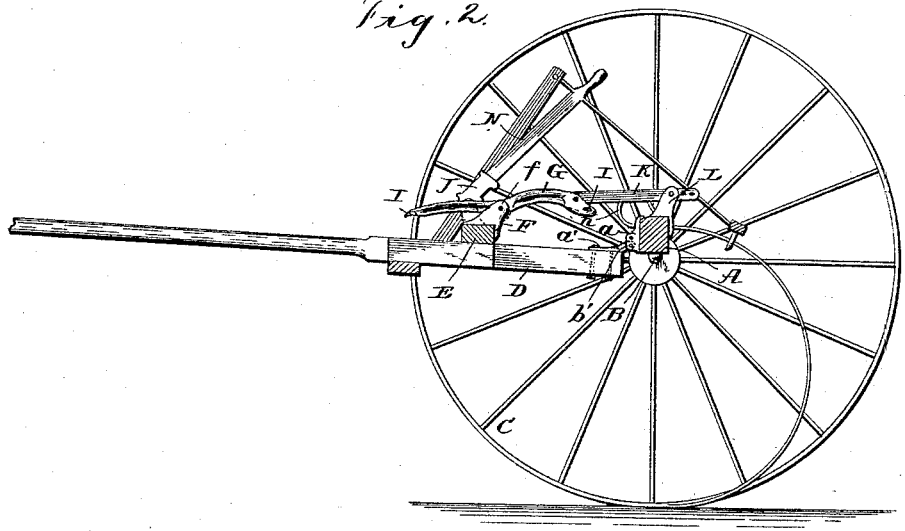
Figure 3:
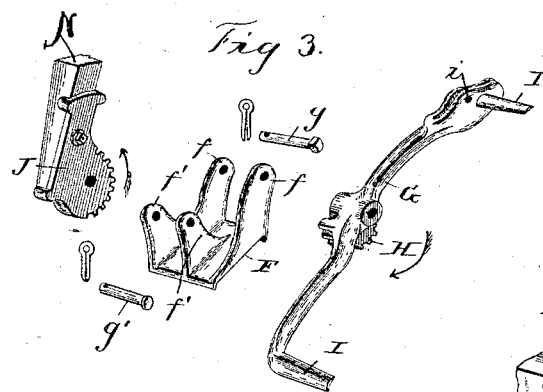
Figure 4:
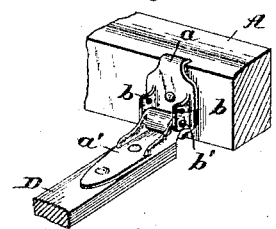

Figure 1 is a perspective view of a horse-rake embodying my invention. Fig. 2 is a vertical cross-section of the same. Fig. 3 is a perspective view of the dumping mechanism, showing the parts detached. Fig. 4 is a detail perspective of a portion of rake-head and one of the shafts, showing the two secured together by my improved compensating hinge.

The object of my invention is to provide a horse-rake which may be operated with the least possible exertion to horse and operator and without liability to accidental breakage or distortion of parts of the mechanism of the rake and dumping mechanism.

Another object of my invention is to provide a rake the dumping mechanism of which can be operated by a youth or adult with equal ease and facility.

Another object of my invention is to construct a rake the lock of which may be normally rigid, and which may be broken instantly by a forward movement of the hand-lever, which operates the dumper, or downward pressure on the foot-trip.

In the accompanying drawings, A designates a rake-head, to which are securely fastened the axles B, upon which rotate the wheels C, which support the rake. The head A is provided with leaves $a$ of adjustable hinges, the other section $a'$ of which is secured to the rear end of the shafts D. The sections $a$, which are secured to the head A, are provided with ears having a series of holes $b\ b$, which receive bolts $b'$, which pivotally secure the shafts D to the rake-head A. The height of the rear ends of the shafts D may be varied at will to accommodate the weight and strength of the operator by moving the bolts $b'$ and the leaves $a'$ up or down in the perforations $b\ b$. The shafts D D are provided with a cross-bar E, to which is secured what I shall, for convenience, term a "geared-sector dumper," and which consists of a bracket F, which is provided with two pairs of projections $f f$ and $f'$ $f'$, which projections are perforated to receive pivotal pins $g$ and $g'$, upon which pivotal pins are mounted a double-ended foot-lever or dumping-bar G, pivotally secured between the projections $f f$ by pin $g$, near which pivotal point it has a gear-sector H, and on the ends of which are foot-pins I I. The dumping-bar G is slotted at its rear end and provided with a perforation $i$, through which a pin is inserted to pivotally secure this bar G and dumping-iron K together. In front of the pivotal point of the double-ended foot-lever G is pivotally secured a casting J, which has a corresponding gear-sector, and is pivotally secured by pin $g'$ between the projections $f'$ $f'$ on the bracket F in such a manner that the gear-sector J meshes with the gear-sector H to operate the dumper through the medium of the double-ended foot-lever G, a dumping-bar K, and a dumping-iron L, secured to the rake-head A, the dumping-bar K being pivotally secured at its ends to the two. This dumping-bar K is provided with a series of perforations at its rear end to facilitate its adjustment where it is pivotally secured to the dumping-iron L. A hand-lever N projects up from the cross-bar E, and is secured to the gear-sector J, which it operates.

As arranged in the accompanying drawings, the gears cannot slip, the hand-lever pushing forward dumps, and pulling back locks, the rake. The angle forward or backward at which the hand-lever N will stand may be varied and regulated at will by meshing the gears together, with the hand-lever N set at any desired angle. This feature and the adjustable hinge admirably adapts the rake to the use of larger or smaller persons, or those with varying lengths of arms, &c. The position of the teeth in raking may be regulated at will through the medium of the series of perforations at the rear end portion of the dumping-bar K.

The rake may be dumped by hand or foot, or both. In order to dump by the foot, press upon the rear foot-pin I and the rigid lock formed by the bars K and G, which hold the rake down to work, will be broken, forming an elbow-joint and raising the teeth. The same movement takes place upon pushing the handle N forward, when the geared sectors J and H act upon each other to produce the same rotation of the bar G.

What I believe to be new and novel, and what I desire to secure by Letters Patent of the United States, and what I therefore claim, is—

1. In a rake, the pivotal head having a dumping-iron secured thereto, in combination with a foot-lever and an adjustable dumping-bar pivotally secured to the foot-lever and to the dumping-iron, said foot-lever having a geared sector formed thereon and a foot projection to one side of the region of said sector, and a second geared sector meshing with the geared sector on the foot-lever, said second geared sector being provided with a hand-lever; all constructed and combined to operate substantially as and for the purposes specified.

2. In a rake, a pivotal rake-head, in combination with a geared sector-dumper mechanism consisting of two intermeshing gear-sectors, one of which is provided with a double-ended foot-lever, the other with a hand-lever, and a bracket-support for the same secured to the frame, a dumping-iron secured to the rake-head, and a dumping-bar pivotally connected at its ends to said foot-lever and dumping-iron, substantially as described.

3. In a rake, the combination of the tilting head having a dumping-iron secured thereto, a double-ended foot-lever having a foot-pin I I on each end of the said double-ended foot-lever, the dumping-bar, a sector-gear formed on the double-ended foot-lever, and a second sector-gear pivotally mounted on the rake-frame forward of the pivotal point of support of the double-ended foot-lever and provided with a hand-lever, all constructed and combined to operate substantially as and for the purposes specified.

4. In a rake, a pivotal head having a dumping-iron, a dumping-bar pivoted to said dumping-iron, a foot-lever pivoted to said dumping-bar and provided with a geared sector, and a hand-lever provided with a geared sector meshing with the sector of the foot-lever, in combination with a leaf of an adjustable hinge provided with a series of perforations and secured to the rake-head, and the other leaf of an adjustable hinge secured to the shaft of the rake, substantially as and for the purposes specified.

In testimony whereof I affix my signature in the presence of two witnesses.

LEONARD W. O'BRIAN.

Witnesses:
   GILBERT E. HALL,
   WALTER J. SMITH.